INVENTOR.
JOHN BRUECKER
BY Norman Gerlach
ATTY.

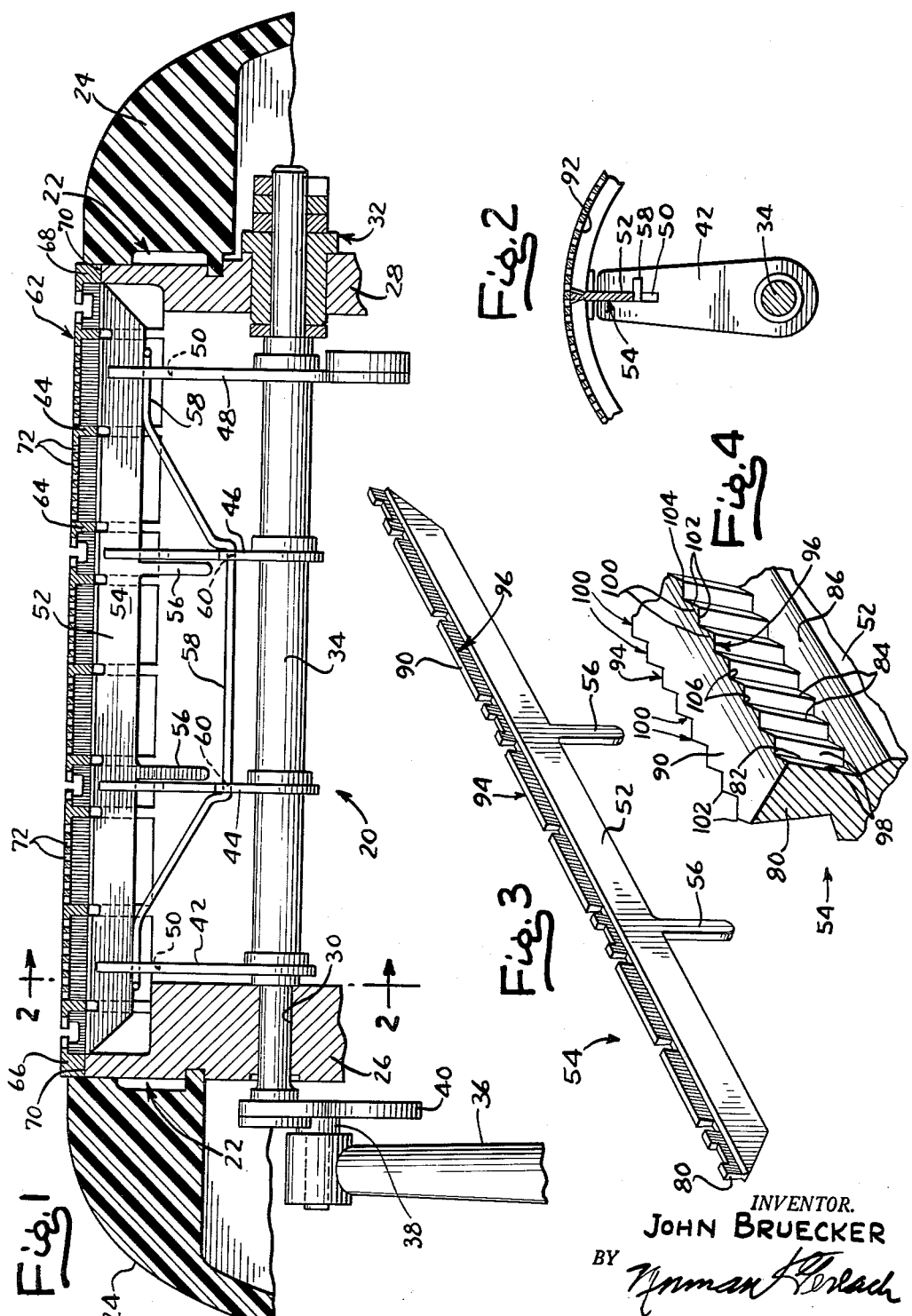

June 11, 1963 — J. BRUECKER — 3,092,904
MOVABLE CUTTER FOR A DRY SHAVER HAVING SAW TOOTH DESIGN CUTTING EDGE
Filed May 9, 1960 — 5 Sheets—Sheet 3
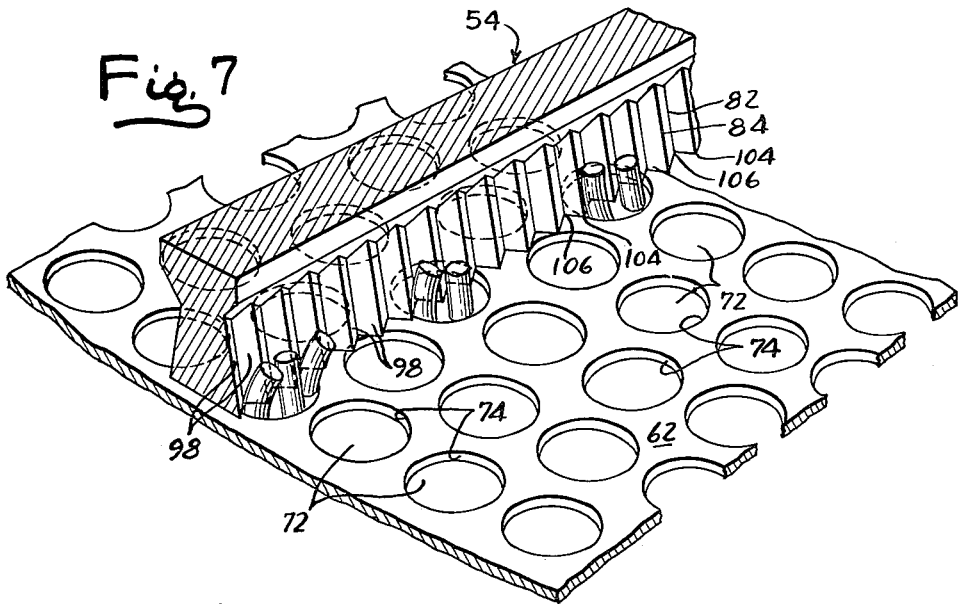
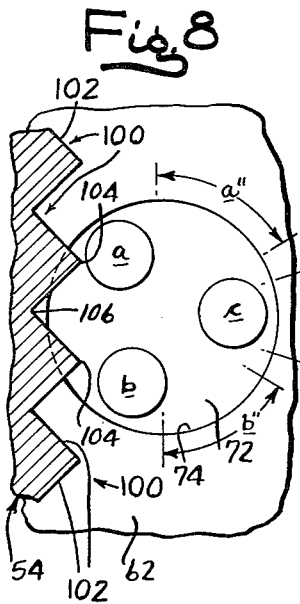
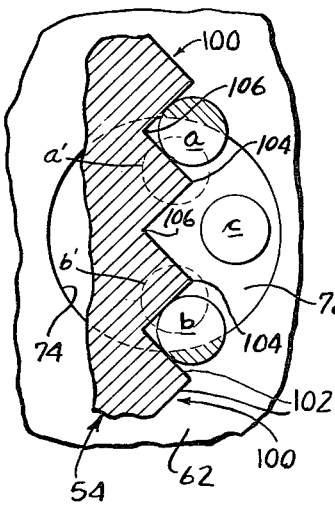
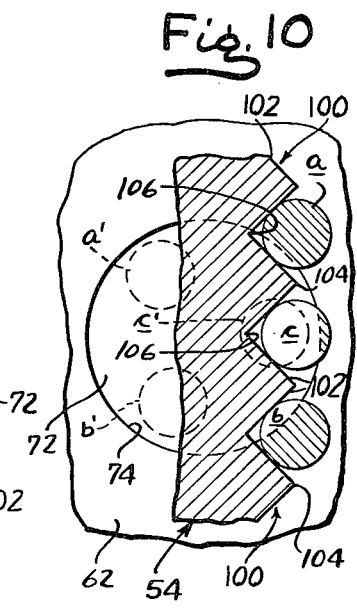
INVENTOR.
JOHN BRUECKER
ATTY.

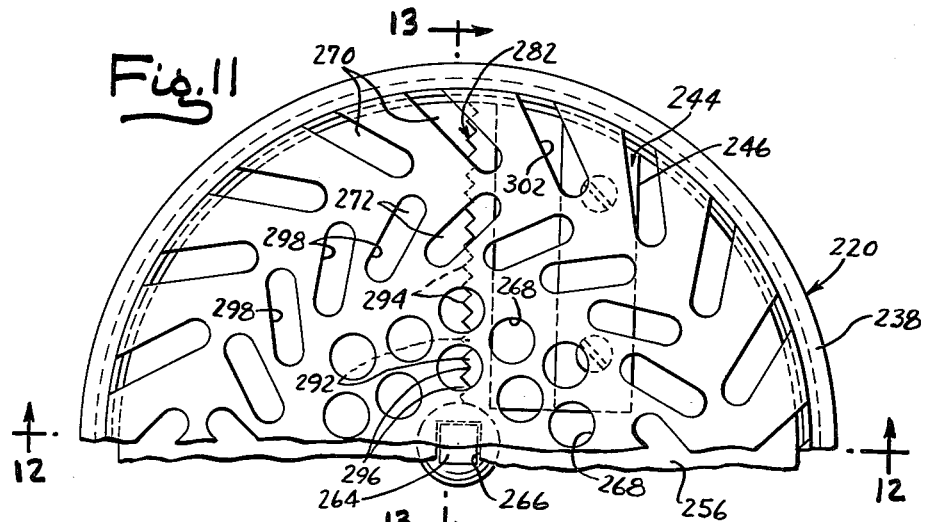
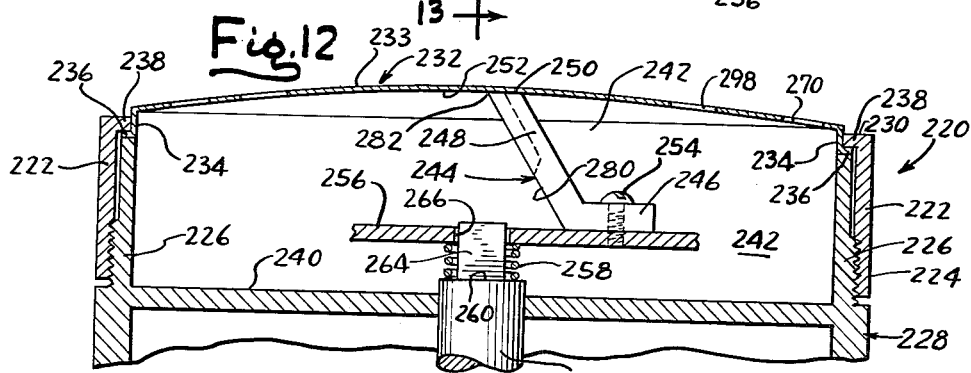
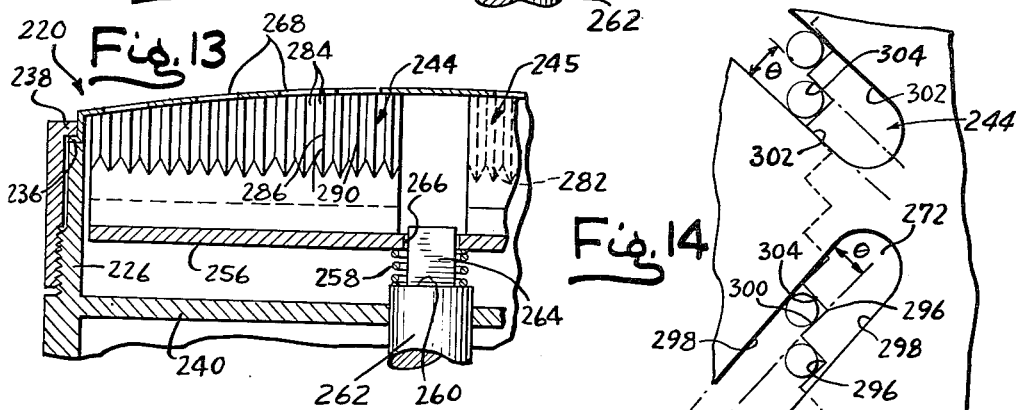
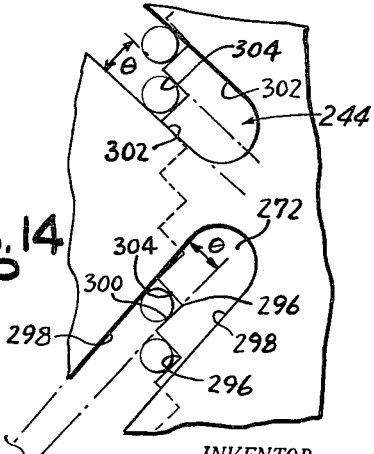
INVENTOR.
JOHN BRUECKER
BY
ATTY.

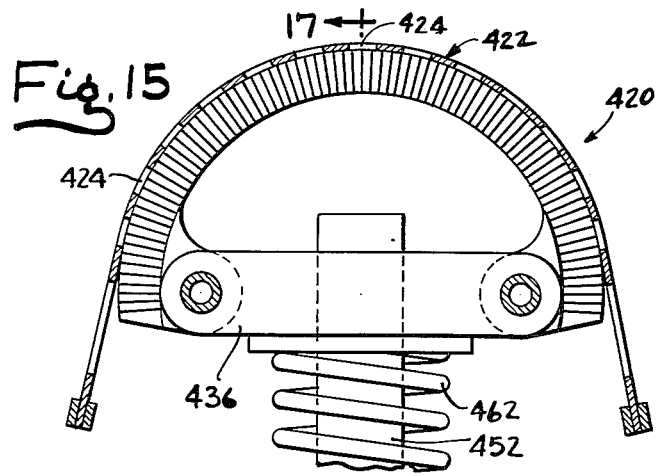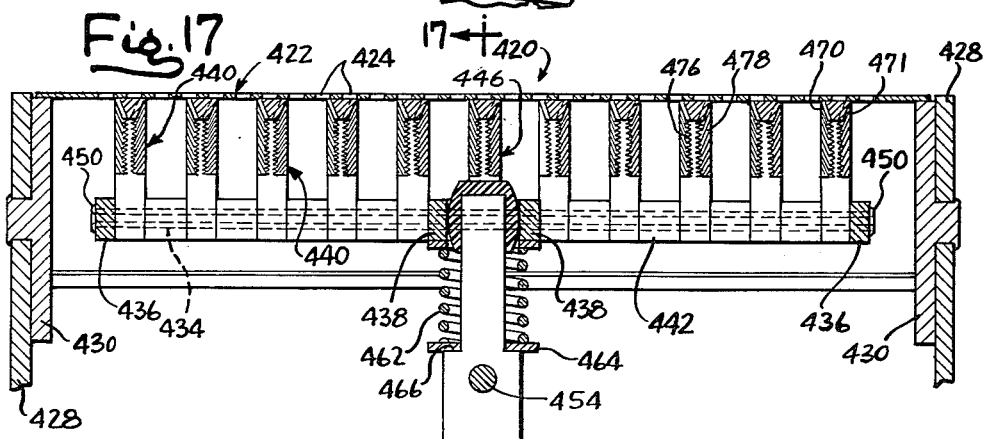

United States Patent Office 3,092,904
Patented June 11, 1963

3,092,904
MOVABLE CUTTER FOR A DRY SHAVER HAVING SAW TOOTH DESIGN CUTTING EDGE
John Bruecker, 1100 N. Verdugo Road, Glendale, Calif.
Filed May 9, 1960, Ser. No. 27,688
2 Claims. (Cl. 30—43)

The present invention relates to improvements in mechanical razors, commonly referred to as dry shavers, and which are usually, but not necessarily, electrically powered. The invention is specifically concerned with a novel shaving head for such shavers and which embodies an improved form of shearing blade or cutter which cooperates with the usual perforated shear plate of the shaver to produce a shearing action which is appreciably more effective than the shearing action attained by shaving heads of conventional design.

Classified as to their basic mode of operation, with but few exceptions, electrically powered dry shavers have since their advent on the market been of three types, namely, the oscillatory type, the reciprocating type and the rotary type. As their designations suggest, in the oscillatory type, the cutter is in the form of a flat blade having a narrow cutting edge which is oscillated across the arcuate inside surface of a perforated shear plate; in the reciprocating type, the cutter may have a straight or a curved cutting edge which is reciprocated across the inside surface of a perforated shear plate which is shaped conformably to the shape of the cutting edge; and in the rotary type, the cutter may likewise have a straight or curved cutting edge which sweeps in circumferential fashion around the inside face of a conformably shaped shear plate. The present invention is, by suitable modification, adaptable for use in connection with all three of the above-outlined basic types of shavers and it has been variously illustrated herein accordingly.

There has also long been upon the market a type of so-called shaver of the reciprocating type wherein the shear plate is not perforated but rather it is in the form of a comb having teeth or tines thereon providing open-ended slots or notches. This shear plate cooperates with a reciprocating cutter in the form of a saw-tooth knife, the teeth on the shear plate and knife cooperating with each other in the manner of a mower for the shearing of such hair as may be entrapped between the adjacent open-ended shear plate slots. Implements of this character are, in reality, not to be classed as shavers. Rather, they are clippers and the principle involved is seldom employed as the basic shaving action in a dry shaver. Usually such saw-tooth cutting devices are employed solely in the manner of clippers or as auxiliary hair trimming adjuncts in association with dry shavers having perforated shear plates and cooperating reciprocating cutters. The novel cutter of the present invention, whether it be designed for oscillating, reciprocating or rotating cooperation with its cooperating shearing element is, in the environment with which it is associated, essentially a dry shaver as distinguished from a clipper in the sense outlined above, and it invariably is associated with a perforated shear plate through which hairs undergoing shearing are projected for shearing cooperation between the edges of the shear plate perforations and the relatively moving cutter.

The perforated shear plates currently employed in connection with shaving heads for dry shavers are invariably provided with a series of closely spaced circular perforations or, alternatively, with a series of elongated slots, usually having semi-circular ends. Experience has dictated that such perforations preferably are of such size as to admit therethrough three, or at the most, four hair strands so that as the substantially straight linear cutter edges sweep past the perforations, there will be a minimum of lateral shifting of the hair strands within the perforations before the shear is effected. In connection with such shaver heads, it is obvious that no shearing action can take place until such time as an individual hair strand is engaged by the cutter edge and forced against a shearing edge of the shear plate, i.e., an edge of the particular perforation through which the strand has been projected. If the perforation be circular and of a size so that it will accommodate four hair strands, for example, no shearing action will take place until such hair strands as may have entered the perforation are carried against the far side of the circular perforation relatively to the direction of travel of the cutter. Since this limited region of the circular shearing edge of the perforation is the only region which is normal to the direction of movement of the cutter edge, it is frequently the only region of the circular shearing edge which is effective to perform a shearing operation. The remaining regions of the circular edge being increments which are at angles ranging from 90° and less,, act rather to guide the hair strand or strands laterally toward the only effective shearing region, which, as previously stated, is in the vicinity of the point on the circular edge which is most remote from the forwardly traveling cutter edge.

Where three or four hair strands are grouped within a given perforation, these strands may, to a certain extent, reinforce one another so that one of the strands which has been forced against the critical shearing point on the far side of the circular perforation may crowd the other strands to a lateral position where they can be sheared by a portion of the circular edge which is not normal to the direction of travel of the cutter. However, there is no certainty that at all times there will be a full complement of four hair strands to appreciably fill the perforation and, more often than not, a single strand, or perhaps two strands, will be the only strands available within the perforation for shearing purposes. In such instances, as outlined above, no shearing action will take place until such time as the cutter edge has encountered a given strand and conducted it, so to speak, forwardly and into engagement with the only portion of the circular edge of the perforation which is effective to perform the shearing operation. Explained in another way, if, for example, a given hair strand is initially encountered by the cutter edge near one side of the perforation laterally displaced from the diametrical center line of the perforation in the direction of travel of the blade, there will be a tendency for such strand to yield to the forward motion of the cutting edge and bend and thus be carried forwardly with an inward component of tilting movement under the influence of the camming action of the adjacent perforation edge which makes too sharp an angle with the linear cutter edge to warrant a shearing action. If the strand is sufficiently long as to ultimately reach the critical shearing region of the perforation edge which is normal to the direction of travel of the cutter, it will be sheared at some point removed from its base and it will remain on the skin for a more satisfactory encounter with the shearing instrumentalities at some successive pass of the shaving head thereacross. If it is not sufficiently long, it will bow to its encounter with the cutter and remain unaffected thereby.

The remarks which have been made above in connection with shearing heads having shear plates with circular perforations therein are applicable to even a greater degree where the shear plates are provided with elongated slot-like perforations.

The present invention is designed to overcome the above-noted limitations that are attendant upon the construction and use of conventional shaving heads having perforated shear plates which cooperate with cutting edges which are substantially linearly straight, and, toward this end, the invention contemplates the provision of a shaving head which, whether it be of the oscillating, reciprocating or rotating type, employs a cutter having a cutting edge which cooperates individually with each hair strand which may be projected through a given perforation to force such strand into shearing cooperation with any edge region of the perforation which may exist immediately forwardly of the strand in the direction of travel of the cutter, and regardless of whether such region be normal to the direction of travel of the cutter or at a steep angle relatively thereto.

The provision of a shaving head of the character briefly outlined above being among the principal objects of the invention, another and important object is to provide such a shaving head wherein the shearing action which takes place between the cutter and the shearing edges of the various perforations in the shear plate with respect to such hair strands as project through the perforations at regions which are laterally displaced from the diametrical center line of the perforation in the direction of travel of the cutter will embody a component of slicing motion whereby to more effectively shear the strands.

Numerous other objects and advantages of an ancillary nature, not at this time enumerated, will become readily apparent as the nature of the invention is better understood.

In the accompanying five sheets of drawings forming a part of this specification, several illustrative embodiments of the invention have been shown.

In these drawings:

FIG. 1 is a sectional view taken substantially centrally, longitudinally and vertically through one form of shaving head constructed in accordance with the principles of the present invention and embodying an oscillatory cutter motor;

FIG. 2 is a sectional view taken substantially along the line 2—2 of FIG. 1 in the direction indicated by the arrows;

FIG. 3 is a perspective view of a cutter employed in connection with the form of the invention shown in FIG. 1;

FIG. 4 is an enlarged fragmentary perspective view partly in section of a portion of the structure shown in FIG. 3;

FIG. 7 is an enlarged fragmentary perspective inside view of the structure shown in FIG. 5;

FIGS. 8, 9 and 10 are schematic views showing the cutter and one of the shear perforations in the shear plate associated therewith in successive relative positions and illustrating the shearing action which takes place between the cutter and plate on a selected group of hair strands;

FIG. 11 is a fragmentary outside plan view of a modified form of shaving head constructed in accordance with the principles of the present invention and embodying a rotary cutter motion;

FIG. 12 is a sectional view taken substantially along the line 12—12 of FIG. 11;

FIG. 13 is a sectional view taken substantially along the line 13—13 of FIG. 12;

FIG. 14 is an enlarged fragmentary outside plan view of limited cooperating portions of the perforated shear plate and cutter associated with the shaving head of FIG. 11 and illustrating schematically the shearing action which takes place between the cutter and plate on a selected group of hair strands;

FIG. 15 is a sectional view similar to FIG. 1 taken substantially centrally, longitudinally and vertically through a further modified form of shaving head constructed in accordance with the principles of the present invention and embodying a reciprocative cutter motion;

FIG. 16 is a fragmentary perspective view of a limited portion of the cutter of FIG. 15;

FIG. 17 is a sectional view taken substantially along the line 17—17 of FIG. 15; and FIG. 18 is a reduced perspective view of the cutter head of FIG. 15.

Figure 5:
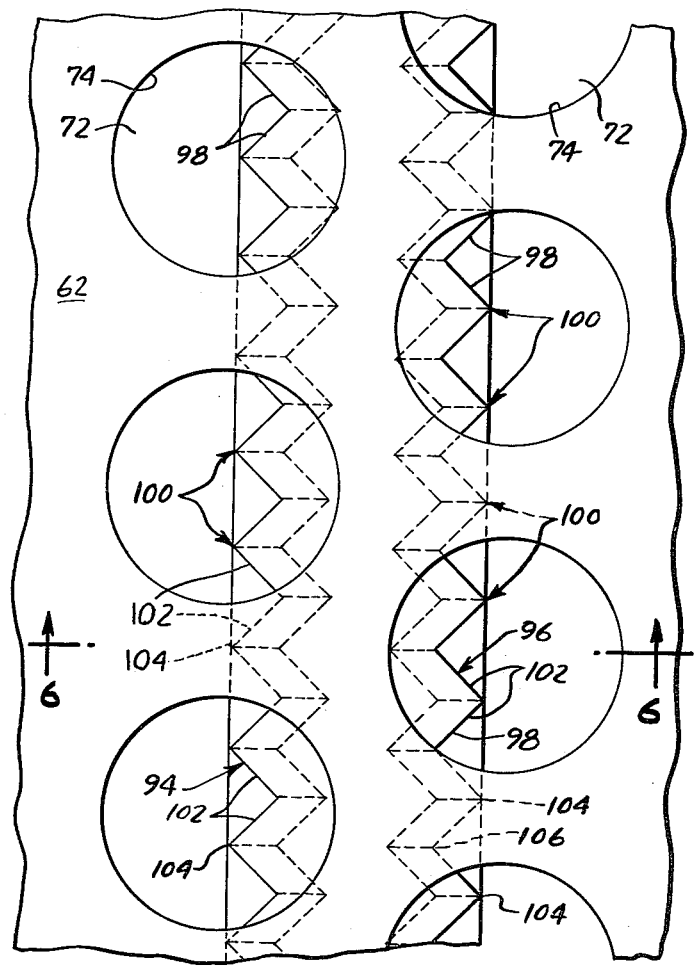
FIG. 5 is an enlarged fragmentary outside plan view, somewhat schematic in its representation, of limited cooperating portions of a perforated shear plate and cutter associated with the shaving head of FIG. 1 and illustrating the manner in which a single cutter may cooperate with adjacent rows of perforations in the shear plate.

Referring now to the drawings in detail, three embodiments of the present invention have been illustrated therein. In FIGS. 1 to 10, inclusive, a shaving head 20 employing an oscillating cutter motion has been disclosed. In FIGS. 11 to 15, inclusive, a shaving head 220 employing a rotary cutter motion has been disclosed. In FIGS. 16 to 18, inclusive, a shaving head 420 employing a reciprocating cutter motion has been disclosed. The shearing principle whereby strands of hair may be sheared from the face of the user remains substantially the same in each instance as will be apparent when each form of the invention has been described in detail.

Referring specifically to FIGS. 1 to 4, inclusive, only those portions of a complete operative shaving implement which are necessary to an understanding of the improvements involved in the present invention have been illustrated in these views. Reference may be had to my prior United States Patent No. 2,081,694, granted on May 25, 1937 for a disclosure of other elements of a shaving implement of the type to which the invention relates.

The shaving head 20 is operatively disposed within an end recess 22 provided in a casing 24 and it involves in its general organization a pair of spaced apart standards 26 and 28, respectively. A bearing surface 30 in the standard 26 and a similar bearing assembly 32 in the standard 28 serve to support therebetween a horizontal oscillatory rock shaft 34. The rock shaft 34 is adapted to be oscillated by means of a connecting rod 36 which is connected to a pin 38 mounted on a crank arm 40 and eccentrically disposed relative to the shaft 14. The means just described for causing oscillation of the rock shaft 34 forms no part of the present invention since other means may be provided for the same purpose, the novelty of the present invention residing rather in the nature of the movable and fixed cutting instrumentalities associated with the shaft 34 and casing 24, respectively, and which will now be described in detail and subsequently claimed.

Still referring to FIGS. 1 to 4, inclusive, fixedly mounted on the rock shaft 34 and extending radially upwardly therefrom in parallel relationship are a series of four cutter supporting arms 42, 44, 46 and 48, each arm having a slot 50 formed in the extreme distal end thereof. The slots 50 are designed for reception therein of the shank portion 52 of an elongated oscillatory generally flat cutter 54. The shank portion 52 of the cutter 54 is formed with a pair of spaced projections 56 which are straddled by the supporting arms 44 and 46 to prevent endwise shifting movement of the cutter. An elongated generally U-shaped wire spring member 58 extends through openings 60 in the blade supporting arms 44 and 46 and projects into the slots 50 of the cutter supporting arms 42 and 48 for the purpose of normally and yieldingly urging the cutter generally upwardly and into shearing engagement with a perforated shear plate 62, the nature and function of which will be made clear presently.

As best seen in FIGS. 1 and 2, the perforated shear plate 62 is arcuate in transverse across section and it is formed with a series of internal arcuate reinforcing ribs 64 in the medial regions thereof. At its ends, the shear plate 62 is formed with inturned flanges 66 and 68 which seat on the curved ends 70 of the standards 26 and 28 respectively, within the recess 22. The shear plate 62 is formed with a large number of small hair-receiving openings 72 therethrough, these openings preferably being of circular design and presenting shearing edges 74 (see also FIGS. 5 and 6).

The construction, design and arrangement of the shear plate 62 per se is not novel and reference may be had to my prior United States Patent No. 2,182,066, granted on December 5, 1939 for a full disclosure of a similar shear plate and of one method by means of which it may be constructed. The present invention resides rather in the novel cutter 54 which cooperates with the shear plate 62 and which will now be more fully described and claimed.

As best seen in FIGS. 3 to 6, inclusive, the cutter 54, in addition to the previously mentioned shank portion 52, includes a distal edge portion 80 which is integral with the shank and which extends outwardly therefrom and coextensively therealong from one end of the elongated shank to the other end thereof. This edge portion 80 is, in the main, somewhat thinner than the flat shank portion 52 and it may be formed by a coining operation which may be effected on the edge region of a suitably shaped flat cutter blank, utilizing suitable coining dies.

Figure 6:
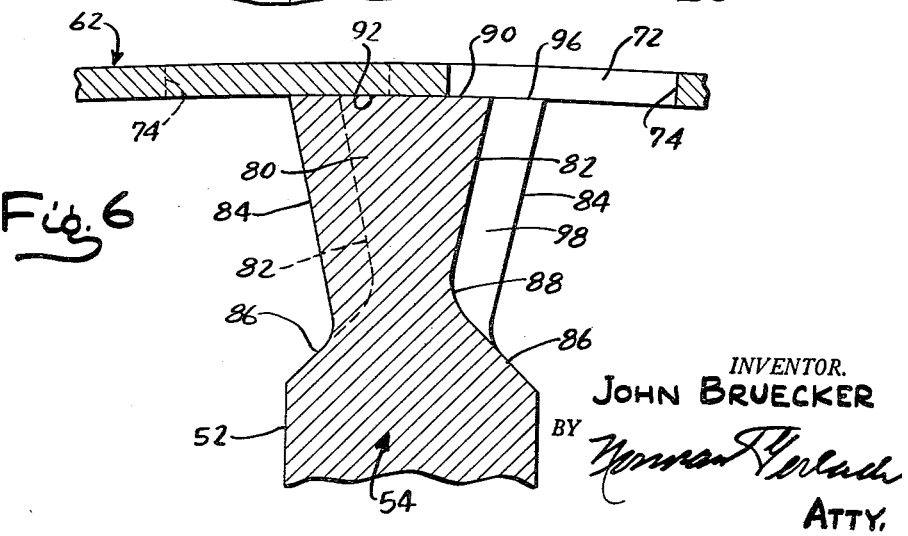
FIG. 6 is a sectional view taken substantially along the line 6—6 of FIG. 5.

Still referring to FIGS. 3 to 6, inclusive, and in particular to FIGS. 4 and 6, the coined distal edge portion 80 of the cutter 54 is generally tapered in transverse cross section as best seen in FIG. 6. The coining dies which press into the metal of the blank are so shaped as to effect this tapered undercut design and they also provide on each side of the edge portion 80 a series of troughs 82 and intervening crests 84 the axes of which are inclined inwardly and downwardly relatively to the general or medial plane of the cutter and which terminate at their inner ends at respective inclined shelf or ledge surfaces 86. The extreme bottom edges of the troughs 82 are preferably merged with the shelf surfaces 86 by fillets 88 which strengthen and rigidify the edge portion 80 as a whole. Except for the fillets 88, the troughs and crests 82 and 84, respectively, present sharp-edged lines of juncture.

The outer or distal end face 90 of the cutter 54 is generally flat except for the extent to which it is lapped to fit the curvature of the inside face 92 of the perforated shear plate 62 and the intersection of the general plane of the surface 90 with the planes of the side surfaces of the troughs 82 and crests 84 create, along the opposite longitudinal edges of the end face 90, two oppositely facing series of shearing edges proper 94 and 96, respectively, each of which is generally of saw-tooth or zig-zag design. The troughs 82, as well as the crests 84, are disposed on opposite sides of the edge portion 80 in staggered relationship, as best seen in FIGS. 5 and 7. The side surfaces 98 of the troughs 82 are planar and adjacent surfaces 98 extend at an angle of substantially 90° to each other.

Referring now to FIGS. 4, 5 and 7, the various inclined troughs 82 and crests 84, at their lines of intersection with the lapped surface 90, create what may, for purposes of description and claim terminology herein, be regarded as shearing teeth 100 (see also FIGS. 8, 9 and 10), these teeth being only two-dimensional and presenting tooth edges 102 which meet at an apex region to provide tooth crests 104 and tooth troughs 106.

In the illustrated form of the invention, the distance between adjacent tooth crests 104 (as well as between adjacent tooth troughs 106) is such that approximately two and one-half shearing teeth 100 will span the diameter of a perforation 72 as the cutting edges 94 or 96 (as the case may be) sweep across the perforation in one direction or the other during the oscillatory motion of the cutter 54. This numerical relationship may best be seen in FIGS. 5, 8, 9 and 10. The number of teeth 100 which will thus span a perforation 72 may be varied within certain limits and the ideal numerical relationship is largely dependent upon the diameter of the perforation or the number of hair strands which each perforation will accommodate for shearing purposes. The numerical relationship of two and one-half teeth for each perforation, as expressed above, is predicated upon a perforation the diameter of which is such that a maximum of three hair strands will be projected through the perforation as the shear plate 62 is moved across the skin of the user. If the size of the perforation is to be designed to accommodate the projection therethrough of four hair strands, then it may be desirable to establish a perforation diameter which is such that three and one-half teeth will span the diameter of the perforation. Roughly speaking, the number of teeth which will span the diameter of a perforation will be half a tooth less than the maximum number of hair strands which, in the ordinary course of using the shaving implement, may reasonably be expected to project themselves through any given perforation. Also, generally speaking, if dimensional variations are to be resorted to, it is preferable that the diameter of the perforations be varied rather than the center-to-center distance between adjacent teeth.

In FIGS. 8, 9 and 10, an attempt has been made to illustrate a typical condition of hair projection through one of the perforations 72 and the manner in which the adjacent teeth 100 and circular shearing edge 74 will cooperate to effect shearing of all the hairs thus projected. Assuming the cutter 54 to be moving in the direction indicated by the arrow in FIG. 8, and disregarding any movement of the shear plate relative to the skin; and assuming that three hairs designated at a, b and c, respectively, have been projected through the perforation 72; the position of the parts in this view is such that the centerline of the hair a lies above the uppermost tooth crest 104 within the perforation (as seen in this view), that the centerline of the tooth lies below the lowermost tooth crest 104 while the hair c is substantially in alignment with, and in the path of movement of, one of the tooth troughs 106 of the oncoming cutter 54.

Thus, as shown in FIG. 9, as the cutter 54 engages the hairs a and b, the hair a will make camming engagement with a tooth edge 102 and be forced upwardly (i.e., laterally outwardly within the perforation) and into shearing relation with respect to the circular shearing edge 74 of the perforation 72. Similarly, the hair b will make camming engagement with a tooth edge 102 and be forced downwardly and into shearing relation with respect to the edge 74.

In this view, the dotted circles designated at a' and b' represent the initial positions of the hairs a and b. The hair c remains unencountered by the cutter 54. Shearing at this time begins to take place along the upper and lower sides of the circular shearing edge 74 as shown by the shaded lines.

In FIG. 10, the cutter 54 is further advanced and the three hairs a, b, and c have aligned themselves with respective tooth troughs 106 and all three are being sheared by the perforation edge 74. The linear arcuate portion of the circular shearing edge 74 which is involved in shearing the hair a has been designated by the bracket a'' in FIG. 8; the arcuate portion for the hair b being designated by the bracket b'' in FIG. 8; and the arcuate portion for the hair c being designated by the bracket c'' in FIG. 8. It will be seen, therefore, that in the condition illustrated in FIGS. 8, 9 and 10, a 180° arcuate extent of the circular shearing edge 74 of the perforation 72 may be employed for shearing any hairs which may be projected through a perforation 72, whereas with cutters having straight liner shearing edges, only an arcuate extent of about 20° at the far side of the perforation directly in the path of the cutter is effective for shearing purposes. During movement of the cutter 54 in the other direction, the remaining 180° is effective for shearing purposes. The conditions encountered are practically infinite, but, in general, it may be stated that any given strand of hair is usually on one or the other side of the nearest approaching tooth crest 104 on the advancing cutter 54 so that it may be carried forwardly and laterally into immediate engagement with the nearest point on the circular shearing edge 74 of the perforation 72.

In FIGS. 11 to 15, inclusive, a modified form of shaving head has been disclosed. This head, as previously stated, has been designated in its entirety at 220 and the cutter action involved in connection therewith is a rotary one. The head 220 includes a generally cylindrical outer shell 222, the inner open end of which may be threadedly received as at 224 over the forward rim region 226 of the shaver housing 228. The outer circular rim 230 of the shell 222 is closed by a generally circular shear plate 232 having a shallow slightly dished dome portion 233 and a short marginal cylindrical wall 234 provided with a laterally turned rim flange 236 which underlies an inturned rim flange 238 on the shell 222. The shear plate 232 and shell 222, in combination with a front wall 240 which extends across the shaver housing 228, defines an internal cutter chamber 242 around the peripheral regions of which a pair of rotary cutters 244 and 245 are adapted to sweep in a circular path.

Each cutter 244 or 245, as the case may be, is in the form of an obtuse angle piece having a horizontal attachment flange or base portion 246 and an upwardly and forwardly inclined blade portion 248, the upper edge 250 of which is shaped conformably to the curvature of the inside surface 252 of the dome portion 233 of the shear plate 232. The attachment flange 246 is secured by screws 254 to a circular mounting plate 256 which is floatingly supported on a spring 258 seated on a shoulder 260 provided on a rotary cutter drive shaft 262 projecting through the wall 240 and surrounding a non-cylindrical drive shaft extension 264. The extension 264 projects through a conformably shaped hole 266 provided centrally in the mounting plate 256 for cutter driving purposes. The spring 258 serves normally to urge the entire cutter assembly upwardly in the chamber 242 and cause the upper edge 250 of the cutter blade portion 248 to yieldingly engage the inside surface 252 of the dome portion 233 of the shear plate.

The dome portion 233 of the shear plate is formed with a series of closely spaced circular perforations 268 which may be similar to the perforations 72 described previously in connection with the shear plate 62. The circular perforations 268 are grouped in the central region of the shear plate while in the peripheral regions of the dome portion 233 there are formed two series of circumferentially spaced elongated perforations or slots 270 and 272, respectively. The slots 270 and 272 are preferably, but not necessarily, arranged in adjacent pairs with the longitudinal axes of the slots of each pair extending at a right angle to each other for purposes that will be made clear presently. The various perforations, both circular and elongated, are, of course, disposed in the path of sweeping motion of the two cutters 244 and 245.

The shaving head 220 thus far described is more or less conventional in its design and correlation of mechanical parts, and the novelty associated with this form of the invention resides in the serrating or coining of the forward or leading faces 280 of the cutters 244 and 245 to produce a generally radially extending saw tooth shearing edge 282 of saw-tooth design on each of the cutters (see particularly FIG. 13) near the outer region of the same.

It is deemed needless to enter into a detailed description of the nature of the serrated or coined regions associated with the two rotary cutters 244 and 245 except to point out that they are substantially identical in configuration to the coresponding regions provided on the previously described cutter 54. The planar side surfaces 284 of the inclined troughs 286 are disposed at an angle of 90° to each other and the inclined troughs 286 and crests 290 (FIG. 13), in combination with the upper edge 250 of the cutter 244, create a series of two-dimensional shearing teeth 292 which meet at apex regions to provide tooth crests 294 and tooth troughs 296, respectively (FIGS. 11 and 14). The manner in which the teeth 292 cooperate with the circular shear perforations 268 is substantially the same as has been described in connection with the shearing head of FIGS. 1 to 4, inclusive, and as explained in detail with reference to FIGS. 8, 9 and 10. Since the angular displacement of the shearing edge 282 in sweeping past any one single perforation 268 is extremely small, the small shearing increment which involves but two and one-half teeth 292 may, for all practical purposes, be regarded as moving linearly in a straight line. Thus, the diagrammatic representations of FIGS. 8, 9 and 10, and the previous discussion thereof, are equally applicable in the present instance and may be referred to for an understanding of the shearing action which takes place between the teeth 292 and the perforations 268.

It has been stated previously that the axes of the adjacent slots 270 and 272 in the two concentric series of slots near the periphery of the shear plate 232 extend at right angles to each other. As best seen in FIG. 14, the parallel side edges 298 of the various slots 272 assume chordal relationships to the circular periphery of the shear plate 232 which are such that as the saw-tooth shearing edge 282 sweeps into register with the individual slots, the side edges 300 of the adjacent tooth troughs 296 will each make a small angle, for example, an angle of 1°, with these side edges 298 as indicated by the angle $\theta$. Thus, a hair such as the hair designated at $c$ in this view will be securely entrapped between the side edges 300 and 298 for shearing purposes.

Similarly, and for the same reasons, the parallel side edges 302 of the various slots 270 assume chordal relationships to the circular periphery of the shear plate which are such that as the saw-tooth shearing edge 282 sweeps into register with these slots, one side edge 304 of each tooth trough will likewise make a similarly small angle $\theta'$ with the side edges 304.

Referring now to FIGS. 15 to 18, inclusive, wherein the shaving head 420 has been illustrated in detail and wherein the cutter action involved is a reciprocating one, the shear plate 422 is arcuate in transverse cross section and may be similar in its construction and design to the shear plate 62 associated with the previously described shaving head 20. The plate is provided with perforations 424 having circular shearing edges. The plate 422 may be operatively disposed at the forward end of a shaving housing 428 having locating members 430 for supporting the arcuate end edges of the shear plate.

A cutter assembly 432 is shown in its entirety in FIG. 18. This assembly 432 is generally semi-cylindrical in outline and it is of frame-like design and includes a pair of elongated parallel tie members 434 in the form of tubular elements across which there extend a series of four spacer links including a pair of end links 436 and a pair of medial spacer links 438. Between each end link 436 and the adjacent medial link, a series of four arcuate cutter bars 440 have their ends press-fitted over the tie members 434 and maintained in their spaced relationship by spacer collars 442. An additional central arcuate cutter bar 446 is similarly mounted on the tie members 434 between the medial spacer links 438. The ends of the tie members 434 are beaded as at 450 to hold the various parts in their assembled relationship.

Reciprocation of the cutter assembly 432 longitudinally of the arcuate shear plate 422 may be effected by an oscillatable drive arm 452 (FIG. 17) which is pivoted on a shaft 454 carried by the housing 428 and the inner end of which is slotted as at 456 to receive a crank pin 458 carried eccentrically on a rotor 460. The outer end of the drive arm 452 projects into the space existing between the two medial spacer links 438 and transmits its to-and-fro motion to the cutter assembly 432 as a whole through the medium of these links. A spring 462, seated on a washer 464, which, in turn, is seated on a shoulder 466 provided on the arm 452, serves to yieldingly urge the cutter assembly upwardly to establish the proper shearing cooperation between the various cutter bars 440 and the shear plate 422.

The opposite sides of each cutter bar 440 are coined as at 470 and 471, respectively, to produce inwardly inclined troughs 472 and intervening crests 474, the series of troughs and crests extending a major distance around the arcuate extent of the inclined side faces, respectively, of the bar. These troughs 472 and crests 474 are similar in their design to the troughs and crests 82 and 84, respectively, associated with the cutter 54 of the form of the invention shown in FIGS. 1 to 14, inclusive. As is the case in connection with the cutter 54, the opposite planar side surfaces 480 of the troughs 472 are disposed at an angle of 90° to each other and the inclined troughs and crests create a series of two-dimensional shearing teeth 482 which meet at apex regions to provide tooth crests 484 and tooth troughs 486, respectively.

The manner in which the shearing teeth 482 cooperate with the circular shear perforations 424 is substantially the same as has been described in connection with the shearing head of FIGS. 1 to 4, inclusive, and as set forth in detail with reference to FIGS. 8, 9 and 10. The schematic disclosure of FIG. 16 will reveal the fact that the various troughs 472, as well as the crests 474, are staggered on opposite sides of each arcuate cutter bar. It will also disclose the spanning of the various perforations 424 by approximately two and one-half cutter shearing teeth 482 as the arcuate saw-tooth cutter edges assume their mid-position with respect to any given perforation 424.

The shearing heads 20, 220 and 420 disclosed herein are essentially designed for use in connection with the shearing of human hair, which, on the average has a diameter of 0.006 inch. Thus, in accordance with acceptable engineering expediencies, it is contemplated that the diameter of the various perforations 72, 272 and 424 may be on the order of 0.018 inch, in which case, three hairs such as the hairs shown at a, b and c in FIGS. 8, 9 and 10 may conveniently be projected through such perforations. If it is contemplated that four hairs be projected through a perforation, then a perforation of correspondingly larger diameter will be employed.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described the invention what I claim as new and desire to secure by Letters Patent is:

1. A thin plate-like cutter adapted for use in connection with a shear plate having a series of circular perforations therein, said cutter having an end face designed for sliding contact with said shear plate and adapted to traverse said perforations, the leading side of said cutter being formed with a series of elongated parallel troughs and intervening crests which intersect said end face of the cutter and, in combination therewith, define a sharp leading cutting edge of zig-zag configuration, the sides of said troughs and crests being planar, the sides of each trough intersecting each other to define a sharp trough bottom and the sides of each crest intersecting each other to define a sharp crest edge whereby said leading cutting edge at the intersection of the troughs and crests with the end face of the cutter is of sharp saw-tooth design, the leading side of said cutter being undercut and inclined at an obtuse angle to the direction of motion of the cutter whereby said planar sides approach the inside surface of the shear plate at an obtuse angle, the leading side of said cutter being provided with an inclined ledge immediately below said troughs and crests, the combined width of two adjacent troughs being less than the diameter of the shear plate perforations and the combined width of three consecutive troughs being greater than the diameter of the shear plate perforations.

2. A thin plate-like cutter adapted for use in connection with a perforated shear plate, said cutter having an end face designed for sliding contact with the shear plate and having opposite sides each of which is formed with a series of elongated parallel troughs and intervening crests which intersect said end face of the cutter and, in combination therewith, define a sharp edge of zig-zag configuration, the sides of said troughs and crests being planar, the sides of each trough intersecting each other to define a sharp trough bottom and the sides of each crest intersecting each other to define a sharp crest edge whereby the cutting edges at the intersections of the troughs and crests with the end face of the cutter are of sharp saw-tooth design, the opposite sides of the cutter being undercut and inclined at an obtuse angle to the direction of motion of the cutter whereby the sides of said troughs are likewise similarly inclined.

References Cited in the file of this patent

UNITED STATES PATENTS

| | | |
|---|---|---|
| 2,026,630 | Harris | Jan. 7, 1936 |
| 2,152,815 | Muros | Apr. 4, 1939 |
| 2,223,768 | Martin | Dec. 3, 1940 |
| 2,238,278 | Moskovics et al. | Apr. 15, 1941 |
| 2,240,264 | Muros | Apr. 29, 1941 |
| 2,247,661 | Moskovics et al. | July 1, 1941 |
| 2,266,884 | Martin | Dec. 23, 1941 |
| 2,272,054 | Altemus | Feb. 3, 1942 |
| 2,298,872 | Dalkowitz | Oct. 13, 1942 |
| 2,300,143 | Berg | Oct. 27, 1942 |
| 2,688,184 | Jepson | Sept. 7, 1954 |
| 2,833,033 | Heyek | May 6, 1958 |
| 2,877,548 | Starre | Mar. 17, 1959 |
| 2,890,522 | Bulova et al. | June 16, 1959 |
| 2,900,719 | Kohner et al. | Aug. 25, 1959 |
| 2,915,816 | Gray | Dec. 8, 1959 |

FOREIGN PATENTS

| | | |
|---|---|---|
| 550,903 | Great Britain | Jan. 29, 1943 |
| 1,208,087 | France | Sept. 7, 1959 |